Aug. 12, 1952  G. KRAUS ET AL  2,606,852
RUBBER TO METAL ADHESION

Filed Nov. 16, 1946  2 SHEETS—SHEET 2

INVENTORS
GERARD KRAUS &
ANTHONY CONCIATORI
Spencer Hardman
their ATTORNEYS

Patented Aug. 12, 1952

2,606,852

UNITED STATES PATENT OFFICE 2,606,852

RUBBER TO METAL ADHESION

Gerard Kraus and Anthony Conciatori, Cincinnati, Ohio, assignors to General Motors Corporation, Detroit, Mich., a corporation of Delaware Application November 16, 1946, Serial No. 710,326

9 Claims. (Cl. 154—43)

This invention relates to adhesion cements and to a means for bonding vulcanizable rubber compositions to hard substantially non-porous surfaces through the mediums of said cements.

It is therefore an object of the invention to provide an adhesion cement which will readily bond to the surface of a hard, substantially non-porous material and that will likewise bond to a vulcanizable rubberlike material.

In carrying out the above object, it is a further object to utilize as a base for the cement, polymethyl-pentadiene in a selectively halogenated condition wherein the extent of halogenation is controlled and is not complete.

Another object of the invention is to provide an adhesion cement comprising a base of halogenated polymethyl-pentadiene wherein the halogen content is between 1.04 and 2.51 equivalents of halogen for each unit of methyl pentadiene in the polymer. This range of equivalents is from 32 to 53% by weight when chlorine alone is used.

In carrying out the above object, it is a further object to utilize chlorine as the halogen and in some cases, small quantities of bromine wherein the bromine does not exceed 15% of the chlorine content.

A still further object of the invention is to provide an adhesion cement consisting essentially of chlorinated polymethyl-pentadiene wherein the chlorine content is between 37% and 50% by weight or stated as equivalents 1.30–2.23.

Another object of the invention is to provide a means for bonding vulcanizable rubberlike compositions, such as, natural rubber, butadiene-styrene copolymers, or polychloroprene, butadiene acrylo-nitrile copolymers and other synthetics, to a substantially non-porous and hard base material such as wood, rubber, glass or metal, etc., wherein a tempering layer is utilized between the chlorinated adhesion cement and the rubberlike material, said tempering layer acting as a means for increasing the strength of bond and being selected from the class or highly reenforced rubber cements.

Further objects and advantages of the present invention will be apparent from the following description, reference being had to the accompanying drawings wherein preferred embodiments of the present invention are clearly shown.

Figure 1:
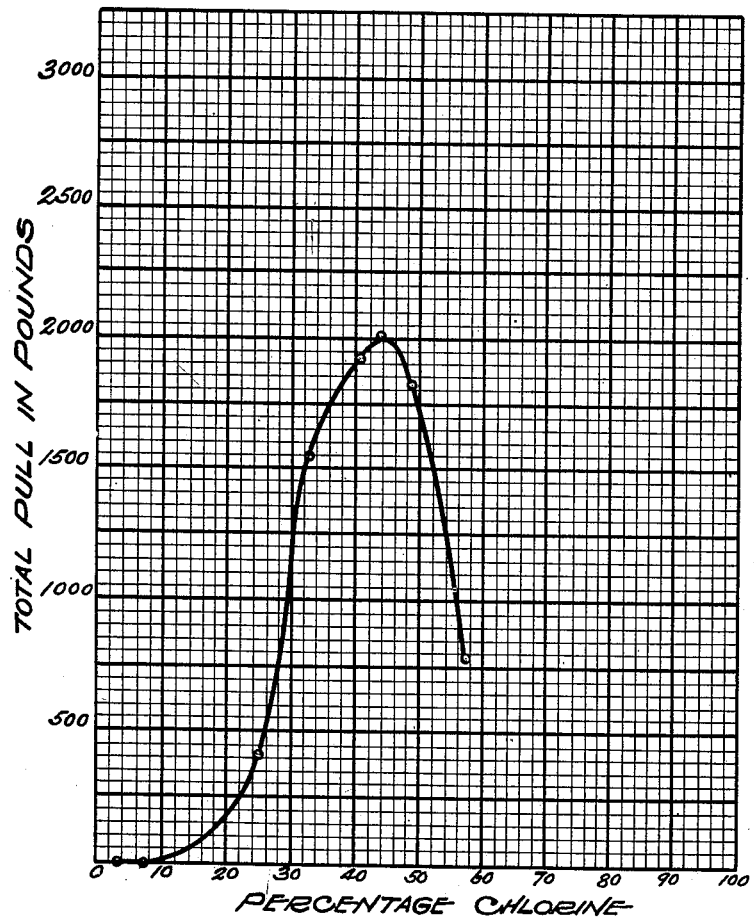
Fig. 1 shows the chart which illustrates graphically, bond strengths for chlorinated polymethyl-pentadiene cements plotted against the percentage of chlorine in the cement.
Figure 2:
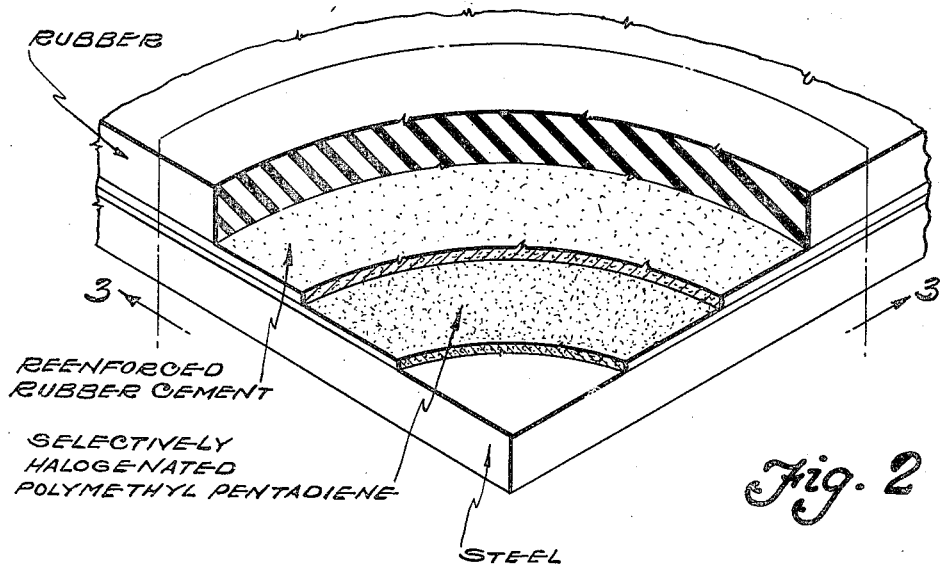
Fig. 2 is a perspective, partly cut away and in section, illustrating the method of performing the adhesion.
Figure 3:
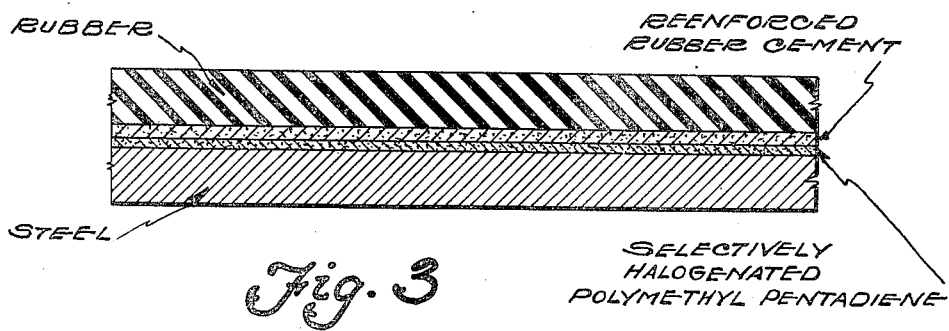
Fig. 3 is a section taken on line 3—3 of Fig. 2.

The use of partially chlorinated rubber and chlorinated isoprene as a base material for an adhesion cement has been disclosed in application Ser. No. 645,666, now abandoned. The use of chlorinated polychloroprene as a base material for an adhesion cement has been disclosed in Ser. No. 661,013, now abandoned, both of said applications being assigned to the assignee of the present invention. In each case, the chlorination of the conjugated diene compound is selectively controlled and is not complete. In fact a range of partial chlorination is stated in each case wherein the tensile pull under A.S.T.M. methods, in all cases is above 750 lbs. per square inch. In the present instance, in place of rubber, polyisoprene or polychloroprene we propose to use another polymer of the conjugated diene type, namely, polymethyl-pentadiene. This polymer is likewise used as a base for an adhesion cement in a selectively halogenated and preferably chlorinated condition. In this instance, however, we have found that polymethyl-pentadiene yields a curve when tensile pulls are plotted against percentage chlorination which is broader than the curves of the other halogenated conjugated dienes. This is to say, that the slope of the curve is less whereby a greater range of chlorination may be used. In this manner, manufacture of the chlorinated polymer is less critical as tensile pulls in the order of 750 and above may be obtained over a broader range of chlorination, for example, a range up to 21% and specifically between 32 and 53% by weight of chlorine in the polymer. This percentage range stated differently is between 1.04 and 2.51 equivalent of a halogen for each unit of methyl pentadiene in the polymer.

We have found that complete chlorination of polymethyl-pentadiene yields a product having approximately 63% by weight of chlorine present. Theoretically the complete chlorination percentage should be in the order of 64% but due to variations in the polymer, inclusions and methods of chlorination, the optimum figure is seldom reached. This fact is of little moment here since we propose to chlorinate in a partial chlorination range wherein the maximum percentage of chlorine utilized does not exceed 53% by weight.

The use of fully chlorinated rubber cements or polyisoprene cements is known but these cements do not yield uniformly high pulls as are obtained when our partially chlorinated cements are utilized. Further, as set forth here, the method of manufacture is less critical when partial chlorinations are used since the difficulties of obtaining complete chlorination are eliminated.

We have found that the strength of bonds produced by the use of chlorinated elastomeric cements can be markedly increased and, in some cases, doubled by the selective control of the extent of chlorination in the chlorinated polymer. In this connection we have found that incompletely chlorinated products wherein the extent of chlorination varies between 32 and 53, yield considerably better results than completely chlorinated products. We have also found that a preferred range of from 37 to 50% yields optimum results.

In place of chlorine some bromine may be added, for example, up to 15% by weight of the total chlorine used, with no deleterious effect although it is understood that bromine, being more expensive than chlorine, is not as desirable a substituent from an economic angle.

We have also discovered that the use of compounding ingredients in our improved cement, while they do not in any way harm the action of the cement, are superfluous and that a partially chlorinated polymer dissolved in a suitable solvent such as, a mixture of carbon tetrachloride and xylene, yields just as good results from a strength standpoint as do highly compounded cements.

Another factor which contributes to the success of our cement and aids in increasing the strength of bond, is the use of a tempering layer. The partially chlorinated adhesion cement is primarily adapted for bonding to metal, glass, wood or other hard substantially non-porous surfaces. We, therefore, propose to use a tempering layer between the rubber and the partially chlorinated adhesion cement whereby the adhesion cement readily bonds to the tempering layer and the tempering layer bonds with greater strength to the rubber than can be accomplished when its use is eliminated. This tempering layer may be any conventional, highly reenforced type rubber cement and is preferably one which includes substantial quantities of carbon black and/or sulphur so that the physical characteristics of the tempering layer are different from rubber stock in being harder and tougher but not as extremely different as are the characteristics of the adhesion cement layer. In this manner, a gradual tempering of hardness is obtained, that is, a gradual increase in hardness from any specified rubber stock to the adhesion cement.

In order to describe the invention more clearly the following example is given to show one specific method utilized in making the partially chlorinated rubber adhesion cement.

Example 50 parts of polymethyl pentadiene are dissolved after milling, in 500 parts of carbon tetrachloride. Chlorine is led into a vigorously agitated solution of this material until a sample analysis of the product shows that a chlorine content within the desired range is obtained. The entire mixture is then run slowly into boiling water where it remains until the solvent is removed. The partially chlorinated polymer is then taken from the water and dried in a suitable oven. The adhesion cement is prepared from the partially chlorinated polymethyl-pentadiene by dissolving 20 parts of this product in 80 parts of a solution of xylene containing 15% carbon tetrachloride. The adhesion cement is now ready for use either by brushing, spraying, dipping, etc., as a method of application. It is understood that compounding ingredients such as softeners, carbon black, sulfur, accelerators and etc., may be added although, as previously stated, this addition is unnecessary and does not improve the strength of the bond.

Any highly reenforced conventional rubber cement may be used as a tempering layer, such as a cement containing rubber, channel carbon black and solvent; rubber, high sulfur and a solvent, or combinations thereof. In this connection, other fillers, plasticizers and accelerators may be added if desired, together with suitable softening agents. The main ingredients in the tempering layer being rubber, channel carbon black and/or sulfur in appreciable quantities. The specific proportions are not of any great importance but when major deviations are made from the suggested formulas samples should be checked for pull.

Three representative formulas of cements which may be used in the tempering layer are as follows:

Formula #1

| | Per cent |
|---|---|
| Butadiene-styrene co-polymer | 48 |
| Carbon black (channel) | 27 |
| Accelerators, aging and vulcanizing agts., etc. | 2 |
| Zinc oxide | 23 |

Solvent (normal heptane) as required.

Formula #2

| | Per cent |
|---|---|
| Smoked rubber sheet | 38 |
| Carbon black (channel) | 34 |
| Sulfur | 21 |
| Accelerators, softening agts. and aging compound | 5 |
| Zinc oxide | 2 |

Solvent (normal heptane) as required.

Formula #3

| | Per cent |
|---|---|
| Rubber (natural) | 40 |
| Carbon black (channel) | 60 |

Solvent (any aliphatic solvent) as required.

From the above three formulas it may be seen that wide variations in ingredients and quantities thereof are possible. In all the above formulas, butadiene-styrene co-polymer, smoked sheet, pale crepe, polyisoprene or polychloroprene may be used interchangeably.

In the use of the cement, the steel or other material to be cemented is thoroughly cleaned, and in the case of metals is preferably grit-blasted, after which a thin coat of the adhesion cement is applied and permitted to air dry. Over this is placed a thin coat of the reenforced rubber cement and then the rubber stock to be bonded is placed thereon and heated under pressure to effect a cure. In this connection, it is obvious that if metal, wood or glass parts are to be cemented together that the second layer of reenforced rubber cement is unnecessary since the two parts to be cemented have similar physical characteristics.

Tests of the bond obtained through use of our improved cement show a tremendous increase in strength over prior art materials. When using standard A. S. T. M. methods of test on two square inch specimen, it was found that completely chlorinated natural rubber or polyisoprene cement has bond strengths between 800 to 1,200 pounds whereas with cements from partially chlorinated polymethyl-pentadiene wherein the percentage of chlorination of the polymer is approximately 43.5%, a high average figure of 2,000 pounds was obtained. The bond strength between steel and rubber, butadiene styrene copolymers and polychloroprene stocks were substantially uniform. In all cases the assembled specimen was vulcanized from 20 to 30 minutes at approximately 300° F. and in all cases a two coat bond was utilized.

In connection with certain synthetic rubbers tested, for example butadiene-acrylo-nitrile copolymers, the tensile strength of the stock was not as great as the strength of the bond with the result that high pulls were not obtained due to failure in the stock per se. Obviously the cement is satisfactory in such cases and high test figures may be obtained by improvement in the physical properties of the stock.

The following table gives pounds' pull for rubber and/or polyisoprene bonded to steel through the use of a chlorinated polymethyl-pentadiene cement.

*Chlorinated polymethyl-pentadiene by standard ASTM method on 2 sq. inch specimen*

| Percent Cl | Total Pull (average) |
|---|---|
| | lbs. |
| 25.5 | 400 |
| 30.0 | 800 |
| 33.5 | 1,540 |
| 43.5 | 2,000 |
| 48.5 | 1,820 |
| 52.5 | 1,500 |
| 55.0 | 1,200 |

From the foregoing it is apparent that we have discovered an adhesion cement and method of application therefor which is vastly superior to cements heretofore available. Further, our improved cement is easier to manufacture due to the complete absence of compounding ingredients in the preferred embodiment. In all cases it is possible to eliminate the brass plating of metal parts to be cemented heretofore required with prior art cements.

It is manifest that other synthetics differing from those specifically mentioned may be used. With the rapid advance in synthetic rubber developments other future stocks with improved physical properties will no doubt yield even better results than those herein noted.

While the embodiments of the present invention as herein disclosed, constitute preferred forms, it is to be understood that other forms might be adopted, all coming within the scope of the claims which follow.

What is claimed is as follows:

1. A new article of manufacture, comprising a laminated structure, including at least four layers, one of said layers being a hard substantially non-porous material, another of said layers being a rubber compound taken from the class consisting of, natural rubber, butadiene-styrene-copolymer and polychloroprene, an intermediate layer coextensively bonded to said non-porous layer consisting of a partially halogenated polymethyl-pentadiene, said halogen being taken from the class consisting of chlorine and bromine and wherein the extent of halogenation is in the order of 1.04 to 2.50 equivalents of halogen in the final product for each unit of methyl-pentadiene in the polymer, and a second intermediate layer disposed between said partially halogenated polymer and said rubber compound, consisting of reenforced rubber cement, said article being substantially integral whereby the rubber layer is coextensively bonded to the non-porous material through said intermediate layers by a bond that will sustain a pull of at least 750 pounds per square inch.

2. A new article of manufacture, comprising a laminated structure, including at least four layers, one of said layers being a hard substantially non-porous material, another of said layers being a rubber compound taken from the class consisting of, natural rubber, butadiene-styrene-copolymer and polychloroprene, and intermediate layer coextensively bonded to a non-porous layer consisting of partially chlorinated polymethyl-pentadiene wherein the chlorine content is between 32 and 53% by weight of the compound, and a second intermediate layer disposed between said partially chlorinated polymer and said rubber compound consisting of a reenforced rubber cement containing rubber, carbon black in quantities of at least 50% by weight of the rubber and sulfur, said article being substantially integral whereby the rubber layer is coextensively bonded to the non-porous material through said intermediate layer by a bond that will withstand a pull of at least 750 pounds per square inch.

3. A new article of manufacture, comprising a laminated structure, including at least four layers, one of said layers being a hard substantially non-porous material, another of said layers beign a rubber compound taken from the class consisting of, natural rubber, butadiene-styrene copolymer and polychloroprene, an intermediate layer coextensively bonded to a non-porous layer consisting of partially chlorinated polymethyl-pentadiene wherein the chlorine content is between 37 and 50% by weight of the compound, and a second intermediate layer disposed between said partially chlorinated polymer and said rubber compound consisting of a reenforced rubber cement containing rubber, carbon black in quantities of at least 50% by weight of the rubber and sulfur, said article being substantially integral whereby the rubber layer is coextensively bonded to the non-porous material through said intermediate layer by a bond that will withstand a pull of at least 750 pounds per square inch.

4. A new article of manufacture, comprising a laminated structure, including at least four layers, one of said layers being a hard substantially non-porous material, another of said layers being a rubber compound consisting of natural rubber, an intermediate layer coextensively bonded to a non-porous layer consisting of partially chlorinated polymethyl-pentadiene wherein the chlorine content is between 37 and 50% by weight of the compound, and a second intermediate layer disposed between said partially chlorinated polymer and said rubber compound consisting of a reenforced rubber cement containing rubber, carbon black in quantities of at least 50% by weight of the rubber and sulfur, said article being substantially integral whereby the rubber layer is coextensively bonded to the non-porous material through said intermediate layers by a bond that will withstand a pull of at least 750 pounds per square inch.

5. A new article of manufacture, comprising a laminated structure, including at least four layers, one of said layers being a hard substantially non-porous material, another of said layers being a rubber compound consisting of, butadiene-styrene copolymer, an intermediate layer coextensively bonded to a non-porous layer consisting of partially chlorinated polymethyl pentadiene wherein the chlorine content is between 37 and 50% by weight of the compound, and a second intermediate layer disposed between said partially chlorinated polymer and said rubber compound consisting of a reenforced rubber cement containing rubber, carbon black in quantities of at least 50% by weight of the rubber and sulfur, said article being substantially integral whereby the rubber layer is coextensively bonded to the non-porous material through said intermediate layers by a bond that will withstand a pull of at least 750 pounds per square inch.

6. A new article of manufacture, comprising a laminated structure, including at least four layers, one of said layers being a hard substantially non-porous material, another of said layers being a rubber compound consisting of polychloroprene, an intermediate layer coextensively bonded to a non-porous layer consisting of partially chlorinated polymethyl-pentadiene wherein the chlorine content is between 37 and 50% by weight of the compound, and a second intermediate layer disposed between said partially chlorinated polymer and said rubber compound consisting of a reenforced rubber cement containing rubber, carbon black in quantities of at least 50% by weight of the rubber and sulfur, said article being substantially integral whereby the rubber layer is extensively bonded to the non-porous material through said intermediate layers by a bond that will withstand a pull of at least 750 pounds per square inch.

7. A new article of manufacture, comprising a laminated structure, including at least four layers, one of said layers being steel, another of said layers being a rubber compound taken from the class consisting of, natural rubber, butadiene-styrene-copolymer and polychloroprene, an intermediate layer coextensively bonded to said steel layer consisting of partially halogenated polymethyl-pentadiene, said halogen being taken from the class consisting of chlorine and bromine and wherein the extent of halogenation is in the order of 1.04 to 2.51 equivalents of halogen in the final product for each unit of methyl-pentadiene in the polymer, and a second intermediate layer disposed between said partially halogenated rubberlike compound and said rubber compound, consisting of reenforced rubber cement, said article being substantially integral whereby the rubber layer is coextensively bonded to the steel through said intermediate layers by a bond that will sustain a pull of at least 750 pounds per square inch.

8. A new article of manufacture, comprising a laminated structure, including at least four layers, one of said layers being a hard substantially non-porous material, another of said layers being a synthetic rubber compound taken from the class consisting of, butadiene-styrene copolymer, polychloroprene and acrylonitrile copolymers, an intermediate layer coextensively bonded to said non-porous layer consisting of partially halogenated polymethyl-pentadiene wherein the extent of halogenation is in the order of 1.04 to 2.51 equivalents of halogen in the final product for each unit of methyl-pentadiene in the polymer, and a second intermediate layer disposed between said partially halogenated rubberlike compound and said rubber compound, consisting of reenforced rubber cement, said article being substantially integral whereby the rubber compound layer is coextensively bonded to the non-porous material through said intermediate layers.

9. A new article of manufacture, comprising a laminated structure, including at least four layers, one of said layers being a hard substantially non-porous material, another of said layers being a rubber compound taken from the class consisting of, natural rubber, butadiene-styrene-copolymers, butadiene acrylo-nitrile copolymers and polychloroprene, an intermediate layer coextensively bonded to said non-porous layer consisting of a partially halogenated polymethyl-pentadiene, said halogen being taken from the class consisting of chlorine and bromine and wherein the extent of halogenation is in the order of 1.04 to 2.51 equivalents of halogen in the final product for each unit of methyl-pentadiene in the polymer, and a second intermediate layer disposed between said partially halogenated rubberlike compound and said rubber compound, consisting of reenforced rubber cement, said article being substantially integral whereby the rubber layer is coextensively bonded to the non-porous material through said intermediate layers.

GERARD KRAUS.
ANTHONY CONCIATORI.

REFERENCES CITED

The following references are of record in the file of this patent:

UNITED STATES PATENTS

| Number | Name | Date |
|---|---|---|
| 1,527,715 | Thieme | Feb. 24, 1925 |
| 1,869,636 | Warner | Aug. 2, 1932 |
| 2,234,621 | Brous | Mar. 11, 1941 |
| 2,259,934 | Huijser et al. | Oct. 21, 1941 |
| 2,345,507 | Smith | Mar. 28, 1944 |
| 2,352,637 | Juve | July 4, 1944 |
| 2,423,755 | Calfee et al. | July 8, 1947 |
| 2,447,610 | Calfee et al. | Aug. 24, 1948 |

FOREIGN PATENTS

| Number | Country | Date |
|---|---|---|
| 481,396 | Great Britain | Mar. 10, 1938 |

OTHER REFERENCES

McMillan et. al.: India Rubber World, pp. 663–9 and 714.

Hycar, "Compounding Manual for O. R.," page 8 (1941).